United States Patent [19]
Underhill

[11] Patent Number: 6,145,292
[45] Date of Patent: Nov. 14, 2000

[54] ROUND BALE FORMING APPARATUS

[75] Inventor: Kenneth R. Underhill, Strasburg, Pa.

[73] Assignee: New Holland North America, Inc., New Holland, Pa.

[21] Appl. No.: 09/414,580

[22] Filed: Oct. 8, 1999

Related U.S. Application Data

[63] Continuation-in-part of application No. 09/294,038, Apr. 19, 1999.

[51] Int. Cl.[7] .................................................. A01D 75/00
[52] U.S. Cl. ............................................................. 56/341
[58] Field of Search ........................ 56/341, 343; 100/88, 100/89; 384/42

[56] References Cited

U.S. PATENT DOCUMENTS

| | | | |
|---|---|---|---|
| 4,870,812 | 10/1989 | Jennings et al. | 56/341 |
| 4,913,062 | 4/1990 | Burke | 384/42 |
| 4,924,945 | 5/1990 | Mork | 172/197 |
| 5,444,969 | 8/1995 | Wagstaff et al. | 56/341 |
| 5,899,007 | 5/1999 | Niemela et al. | 172/815 |

*Primary Examiner*—Robert E. Pezzunto
*Assistant Examiner*—Nathan Mammon
*Attorney, Agent, or Firm*—Frank A. Seemar; Larry W. Miller; J. William Stader

[57] ABSTRACT

A round baler for forming crop material into cylindrical bales. The baler has a main frame, a pair of side walls, a crop pickup mounted on the main frame, and a tailgate pivotally connected to the main frame. The tailgate is operative between a closed position during which a bale is being formed in an expandable chamber, and an open position during which a formed bale is being discharged from the chamber. A sledge assembly, pivotally mounted on the main frame for movement between a bale starting position and a full bale position, has crop engaging transverse rollers for urging the crop material along a spiral path in the chamber for starting and forming a bale. An apron is supported along a continuous path on the main frame and tailgate by a plurality of rotatable guide members. The path has an inner course that cooperates with the sledge rolls on the sledge assembly to define moveable walls of the chamber. A drive roll moves the apron along the continuous path. A take up assembly, operative between the bale starting position and full bale position for providing proper apron tension, is maintained between the inner surfaces of the tailgate sidewalls to avoid misalignment.

4 Claims, 6 Drawing Sheets

ROUND BALE FORMING APPARATUS

CROSS REFERENCE TO RELATED APPLICATION

This case is a Continuation-in-part application based on U.S. application Ser. No. 09/294,038, entitled ROUND BALE FORMING APPARATUS, filed Apr. 19, 1999 in the name of Kenneth R. Underhill.

FIELD OF THE INVENTION

The present invention relates to agricultural apparatus for forming and wrapping cylindrical packages of crop material, generally referred to as round balers, and more particularly to a round baler in which a package of crop material, formed in an expandable, generally cylindrically shaped forming chamber, is wrapped with twine, plastic or net to produce a round bale, and then discharged from the baler.

BACKGROUND OF THE INVENTION

Round balers generally have a bale forming chamber defined by a pair of opposing side walls associated with an array of side-by-side belts, transverse slats trained on chains, a plurality of transverse rolls or a combination of these various elements, e.g., rolls and belts. During field operation, windrowed crop material such as hay is picked up from the ground and fed into a fixed or variable diameter bale forming chamber. The hay is then rolled into a cylindrical package, wrapped with twine, net or the like and ejected onto the ground for subsequent handling.

U.S. Pat. No. 5,444,969, issued Aug. 29, 1995 in the name of Robert A. Wagstaff, et al, discloses a prior art round baler of the general nature described above. In this particular type of baler an expandable chamber is defined by a pair of sidewalls, and a plurality of side-by-side belts cooperating with a plurality of transverse rolls, mounted between a pair of pivotally mounted arms. The chamber includes an inlet opening in the front through which crop material is fed. The aforementioned arrangement of rolls and arms is commonly referred to as a sledge assembly. Also shown in the disclosed baler is a pair of take up arms pivotally mounted on the main frame, between which arms a pair of guide rolls are journalled. The outer surfaces of the guide rolls are urged against the belts to maintain belt tension and thereby prevent slack from occurring in the belts during expansion and contraction of the chamber.

The present invention relates to an improved round baler in which a cylindrical package of crop material is formed between expandable walls consisting of a combination of belts and rolls of the general nature described in the preceding paragraph. The '969 patent, cited above, is an example of many prior art patents, assigned to New Holland North America, Inc., that disclose this type of round baler. More particularly, the present invention is directed to improvements to the unique structural characteristics described and claimed in the parent application referred to in the first paragraph of this application, i.e., a round baler having an expandable bale forming chamber defined in part by belts and rolls, wherein the belt take up assembly and sledge assembly operate in concert. These improvements contribute to a round baler featuring, among other things, enhanced performance and improved durability.

SUMMARY OF THE INVENTION

An important object of the present invention is to provide improvements to a round baler having an expandable bale forming chamber defined in part by belts and rolls, wherein the belt take up assembly and sledge assembly operate in concert.

Another important object of the present invention is to provide an anti-twist system for a round baler having an expandable bale forming chamber defined in part by belts and rolls, wherein the belt take up assembly and sledge assembly operate in concert.

Still another important object of the present invention is to provide improvements to a round baler having an expandable bale forming chamber defined in part by belts and rolls, wherein the belt take up assembly and sledge assembly operate between the inner surfaces of the side walls of the bale forming chamber of the baler.

Yet another important object of the present invention is to provide an anti-twist system for a round baler having an expandable bale forming chamber defined in part by belts and rolls, wherein the belt take up assembly and sledge assembly operate between the inner surfaces of the side walls of the bale forming chamber of the baler.

In pursuance of these and other important objects the present invention contemplates a preferred embodiment wherein a baler comprises a main frame, including a pair of opposing side walls, and a tailgate, pivotally connected to the main frame. The tailgate is operative between a closed position during which a bale is being formed, and an open position during which a formed bale is being discharged. The baler further comprises a sledge assembly, mounted on the main frame for movement between a bale starting position and a full bale position, having conveying means with a crop engaging surface extending transversely of the main frame. An apron is supported along a continuous path on the main frame and on the tailgate by a plurality of rotatable guide members, the apron path having an inner course that cooperates with the side walls and the conveying means on the sledge assembly to define a bale forming chamber. Drive means operatively engage the apron to move it along the continuous path. The baler still further comprises a forwardly mounted pickup for feeding crop material into the chamber. An important aspect of the present invention is a take up arm, affixed to the sledge assembly (in the preferred embodiment) for movement therewith between the bale starting position and the full bale position. Operatively associated with the take up arm is an anti-twist system which comprises guide elements on the distal end of the take arms for preventing the take up arms from becoming askew relative to the tailgate under conditions where the tailgate is moved between the closed position and the open position.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
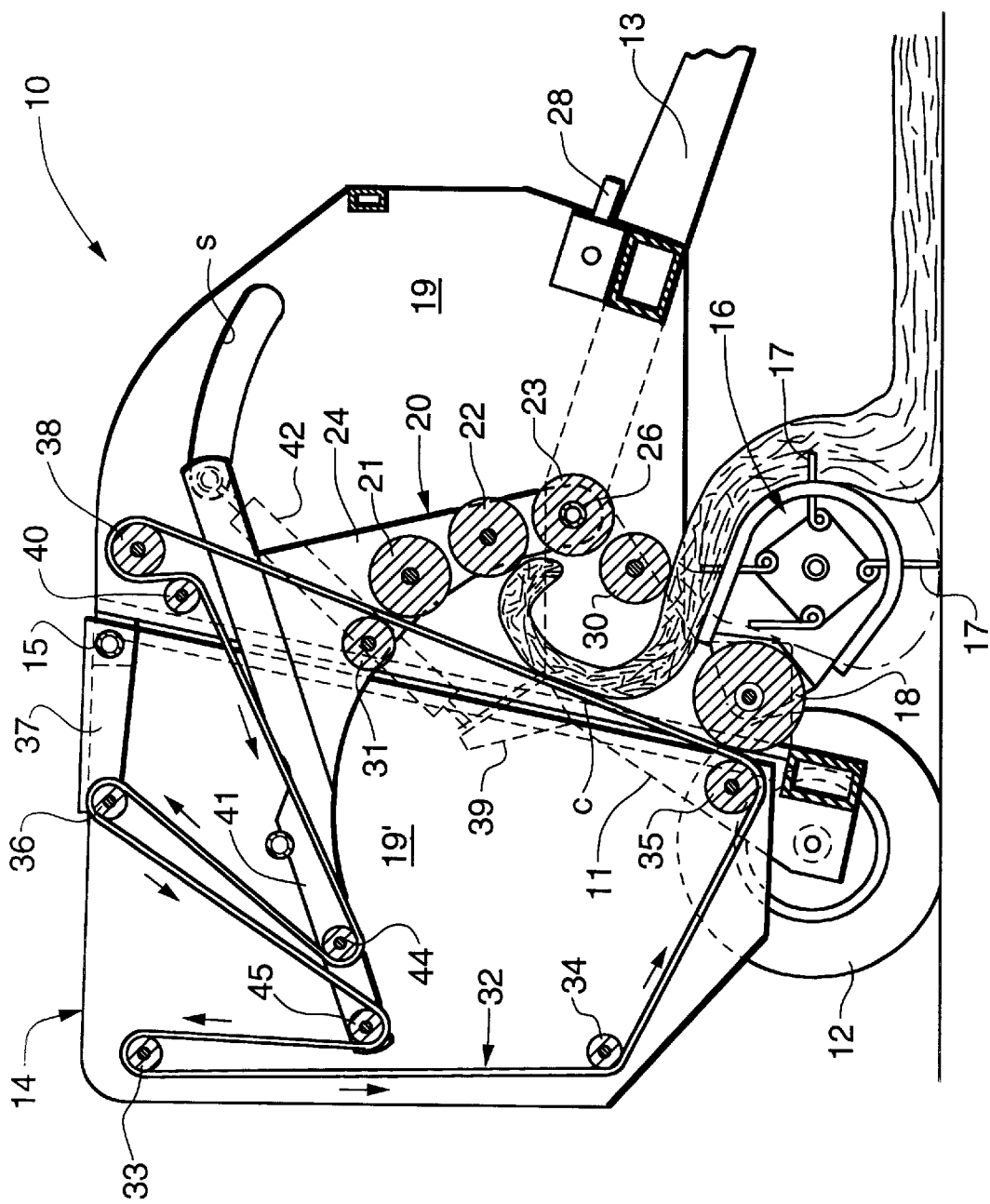
FIG. 1 is a diagrammatic side elevational view of a round baler incorporating the invention to which the aforementioned parent patent application is directed. The tailgate of the baler is in the closed position and the elements of the bale forming chamber are shown in their core starting condition.

Referring to the drawings for a detailed description of the preferred embodiment of the invention, FIG. 1 shows the cross section of a round baler 10 of the type having an expandable chamber defined in part by belts and rolls. This type of expandable chamber is disclosed in various prior art patents, e.g., U.S. Pat. No. 5,444,969 mentioned above, and earlier U.S. Pat. No. 4,870,812, issued Oct. 12, 1989 in the name of Richard E. Jennings, et al, both of which are hereby incorporated is by reference. It should be noted that throughout this description the drawings are diagrammatic in nature to best show the elements of the invention. To this end, in many instances only one element in a pair is shown, especially in those cases where identical elements exist, disposed on opposing sides of the baler, e.g., wheels. It should also be noted that baler 10 shown in FIGS. 1–4 is the preferred embodiment to which the above mentioned parent application is directed, which baler, now to be described in detail, has been provided with improvements to which the present application is directed. At the heart of this application are these improvements which will also be described below, subsequent to the detailed description of baler 10.

To this end, baler 10 has a main frame 11, comprising a plurality of rigid interconnected structural elements including a pair of side walls 19 (only one shown). Main frame 11 is supported by a pair of wheels 12 (also only one shown). A forwardly mounted tongue 13, integral with main frame 11, provides for connection to a tractor. Pivotally connected to side walls 19 by a pair of stub shafts 15 (only one shown) is a tailgate 14 which is closed during bale formation. Tailgate 14 includes sidewalls 19' coplanar with side walls 19. A pickup 16, mounted on main frame 11, includes a plurality of tines 17, the tips of which are movable along a predetermined path to lift crop material from the ground and deliver it rearwardly toward a floor roll 18, rotatably mounted on main frame 11.

An expandable chamber for forming bales is defined partly by a sledge assembly 20 comprising a plurality of transversely extending rolls 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3, and finally to the bale discharge position shown in FIG. 4. Rolls 21, 22, 23 are driven in a counter-clockwise direction by conventional means (for example, chains and sprockets) coupled via an appropriate drive train to a drive shaft 28. A starter roll 30, located adjacent roll 23, is also driven counter-clockwise. Sledge assembly 20 includes a forth roll, a freely rotatable idler roll 31, also carried between arms 24.

The bale forming chamber is further defined by an apron 32 comprising a plurality of laterally spaced side-by-side belts supported by guide rolls 33, 34, 35, rotatably mounted in tailgate 14, and roll 36, rotatably mounted on stationary arms 37, affixed to main frame 11. Apron 32 is also supported on a drive roll 38, mounted on main frame 11. Although apron 32 passes between roll 21 and idler roll 31, it is in engagement only with idler roll 31 and not roll 21 which serves to strip crop material from the belts, in addition to its bale forming function. Suitable coupling means (not shown) connected to drive shaft 28 provide rotation of drive roll 38 causing movement of apron 32 along the varying paths in the directions indicated by the arrows in FIGS. 1, 2 and 3. An additional guide roll 40 in the main frame 11 ensures proper driving engagement between apron 32 and drive roll 38.

A pair of take up arms 41 (only one shown), integral with sledge assembly 20, are affixed to sledge arms 24 for movement between inner, intermediate, outer and bale discharge positions shown in FIGS. 1, 2, 3 and 4, respectively. Take up arms 41, which carry additional guide rolls 43, 44 for supporting apron 32, are urged with sledge assembly 20 toward the innermost position (FIG. 1), i.e., bale starting position, by spring 42, mounted between one of arms 41 and bracket assembly 39, secured to main frame 11. Spring 42, mounted outwardly from wall 19, is pivotally secured to arm 41 by journal means extending through access slot s in side wall 19.

When the elements of round baler 10 are disposed as shown in FIG. 1, an inner course c of apron 32 extends between guide roll 35 and idler roll 31 to form the rear wall of the core starting chamber while the inwardly facing peripheral surfaces of rolls 21, 22, 23 define in a general manner a rearwardly inclined cooperating front wall. Floor roll 18 defines the bottom of the chamber and with starter roller 30 provides an inlet for crop material.

Figure 2:
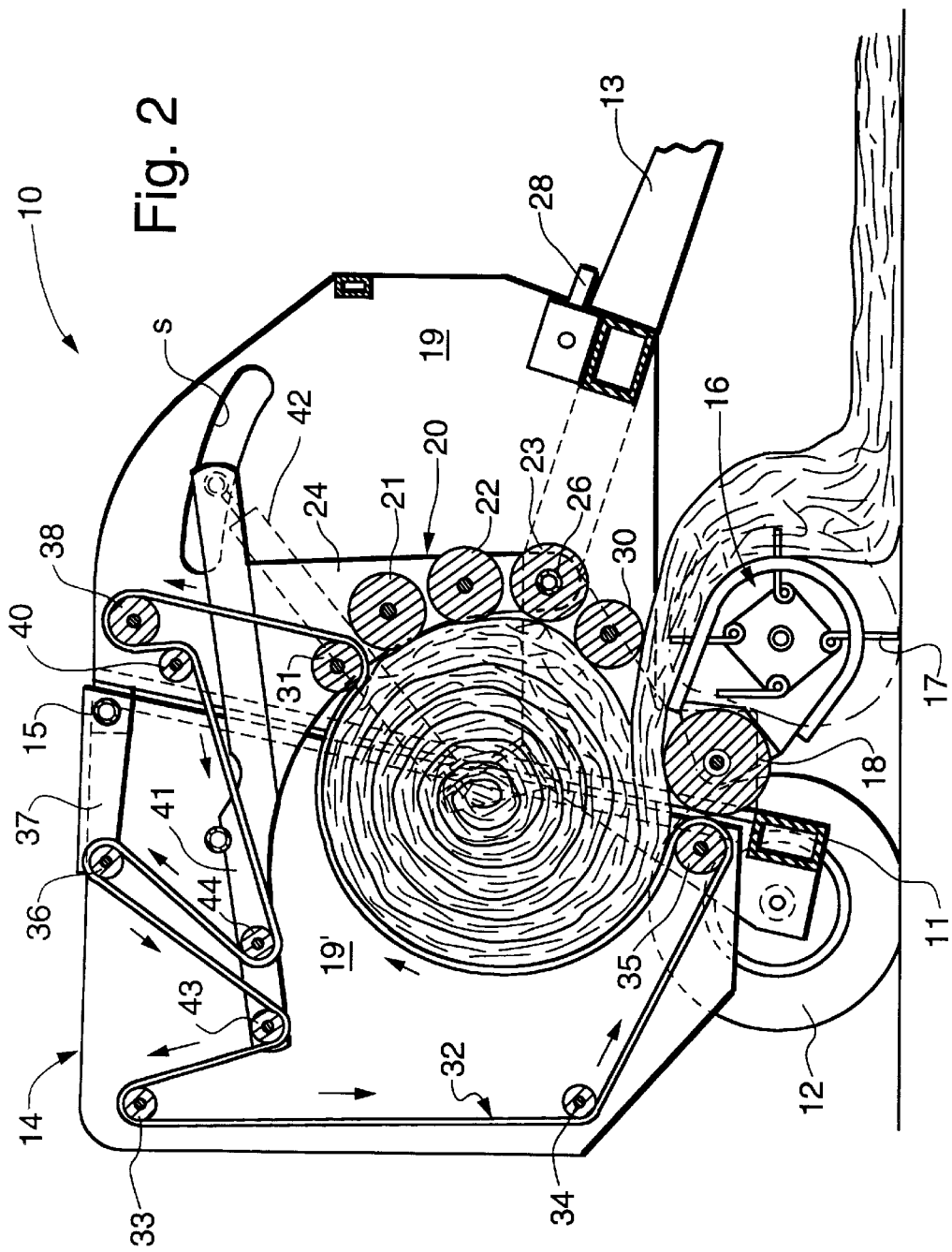
FIG. 2, generally similar to FIG. 1, is a diagrammatic side elevational view of the round baler of FIG. 1 in which the tailgate is in the closed position and the elements of the bale forming chamber are shown in an intermediate bale forming condition.

When round baler 10 travels across a field, pickup tines 17 lift crop material from the ground and deliver it through the inlet. The crop material is carried rearwardly by floor roll 18 into engagement with apron inner course c (FIG. 1) which urges it upwardly and forwardly into engagement with the rolls on sledge 20. In this manner crop material is coiled in a clockwise direction to start a bale core. Continued feeding of crop material into the bale forming chamber by pickup tines 17 causes the apron inner course c to expand in length around a portion of the circumference of the cylindrical package of crop material as its diameter increases (FIG. 2). Take up arms 41 rotate with sledge assembly 20 about the coaxial horizontal axes of stub shafts 26 from their initial positions shown in FIG. 1 toward their outer positions shown in FIG. 3 to provide for expansion of the inner course of the apron in a manner similar to that of the prior art balers mentioned above, i.e., in effect the outer course of the belts of apron 32 is diminished in length while the inner course increases a like amount. After a cylindrical package of crop material has been formed in the fashion described and wrapped with twine or net in a well known manner to form a bale, tailgate 14 is opened and the bale is ejected rearwardly as shown in FIG. 4. It is this open position of tailgate 14 where problems of misalignment have been encountered under some operating conditions. Under normal conditions, subsequent closing of tailgate 14 returns the inner and outer courses of the belts of apron 32 to the locations shown in FIG. 1. However, if arm 41 becomes askew due to, e.g., excessive uneven force caused by spring 42, then without the structure of the present invention, i.e., guide assembly 50 generally depicted in FIG. 5, the arms will not be confined to the space between the inner surfaces of walls 19'. Guide assembly 50 is described in detail below in FIGS. 6–8.

Figure 3:
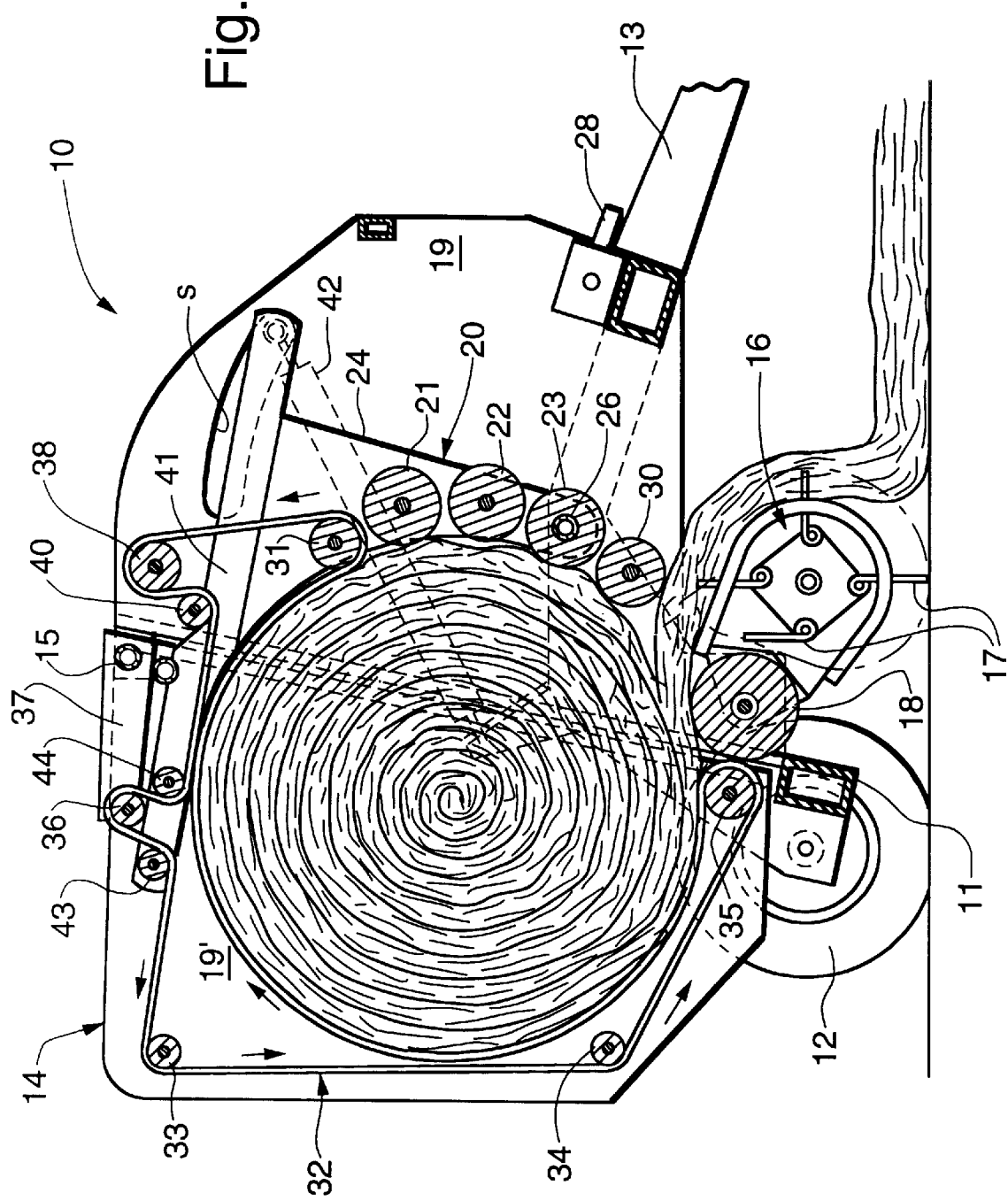
FIG. 3, also generally similar to FIG. 1, is a diagrammatic side elevational view of the round baler of FIG. 1 in which the tailgate is in the closed position and the elements of the bale forming chamber are shown in the full bale condition.
Figure 4:
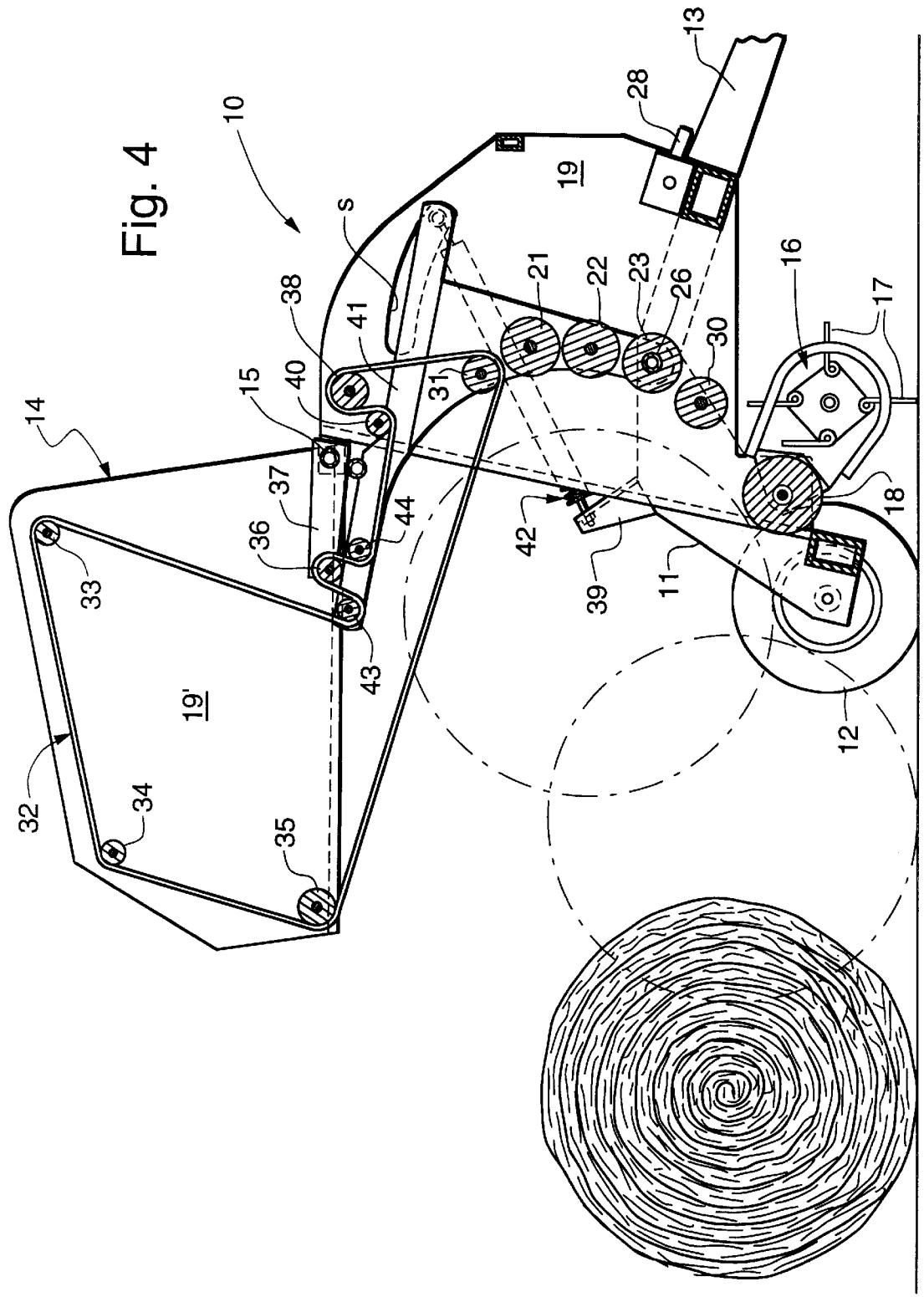
FIG. 4, also a diagrammatic side elevational view of the round baler of FIG. 1, shows the tailgate in the open position and the relationship of the elements of the bale forming chamber after a bale has been discharged.

During formation of a bale by baler 10, sledge assembly 20, due to its unification with the take up assembly, moves with the takeup assembly between a bale starting position (FIG. 1) to a full bale position (FIG. 3). This movement of sledge assembly 20 causes idler roll 31 to move along a generally arcuate path while maintaining apron 32 in close proximity to roll 21. Sledge assembly 20 is pushed outwardly towards its full bale position during bale formation as the crop material expands against rolls 21, 22, 23 and then subsequently is returned inwardly by apron 32 to the position shown in FIG. 1. During this entire operation, as mentioned above, it is important that both the takeup assembly and the sledge assembly are maintained within the space between the inner surfaces of walls 19 and 19'.

With the above description and general operation of baler 10 as a background, attention will now be directed to important features of the new improved structure shown in FIGS. 5–8. As will become apparent, baler 10 is merely illustrative of one of the many round baler configurations to which the features of the present invention are adaptable. For example, varying the number of rolls on the sledge assembly would have no affect on the general aspects of the present invention, nor would the utilization of a take up assembly that was not affixed to the sledge assembly.

Figure 5:
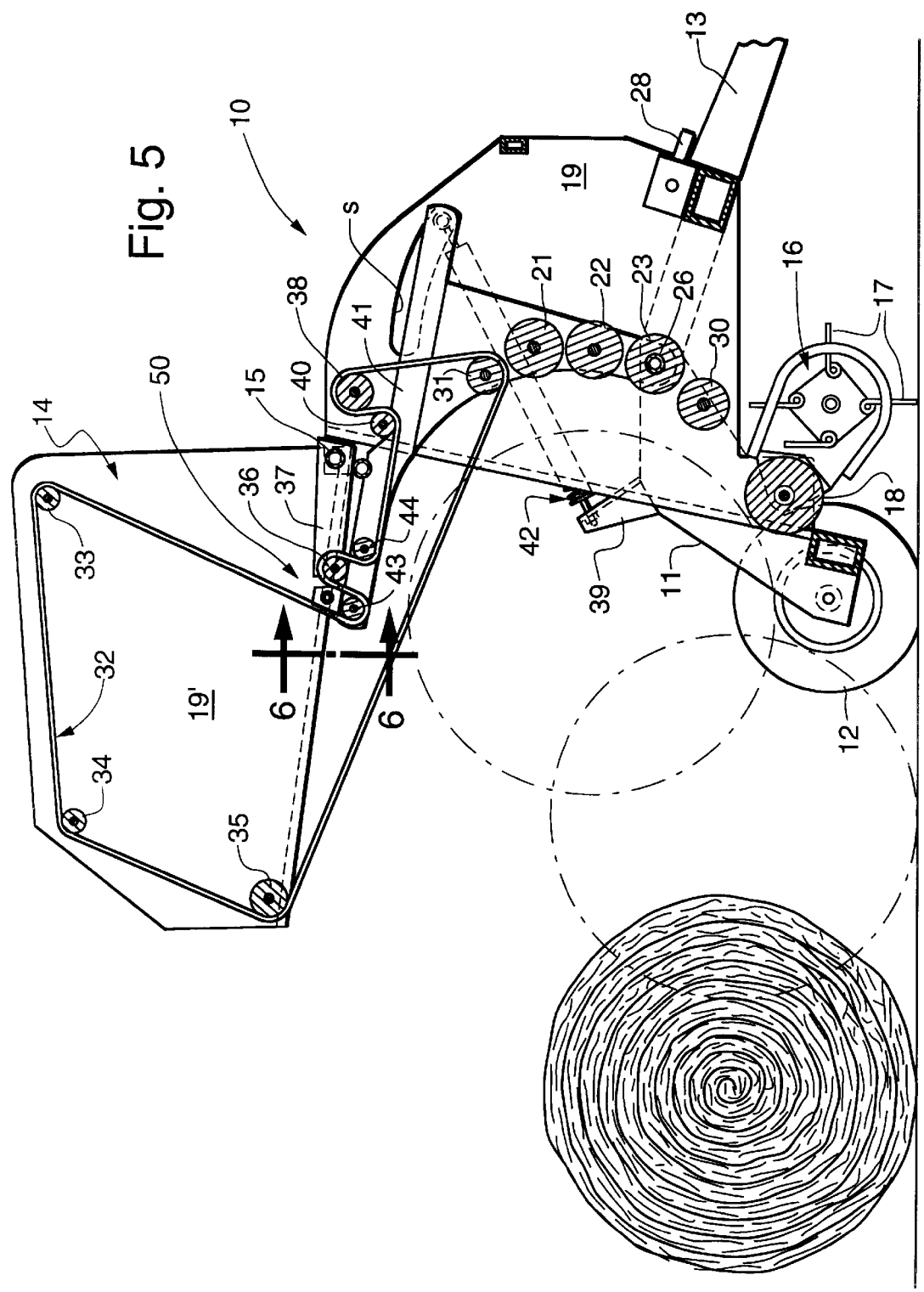
FIG. 5 is a diagrammatic side elevational view of a round baler, similar to the FIG. 1 round baler, in which the present invention is embodied. This view is similar to the FIG. 4 view in that it shows the tailgate of the round baler in the open position and the relationship of the elements of the bale forming chamber after a bale has been discharged.

Guide assembly 50, affixed to the distal end of takeup arm 41, is shown in its operative position on baler 10 of FIG. 5, under conditions where tailgate 14 is in the open position after bale discharge. As is also the case for baler 10 shown in FIG. 4, the distal end of takeup arms 41 is clear of the lower edge of tailgate 14. In the event these arms become misaligned for, e.g., one of the reasons referred to above, the tailgate of the FIG. 4 baler when returned to its closed position will engage the arms causing malfunction and possible damage. Guide assembly 50 obviates this by assuring that the entire takeup assembly slides up inside the tailgate.

Figure 6:
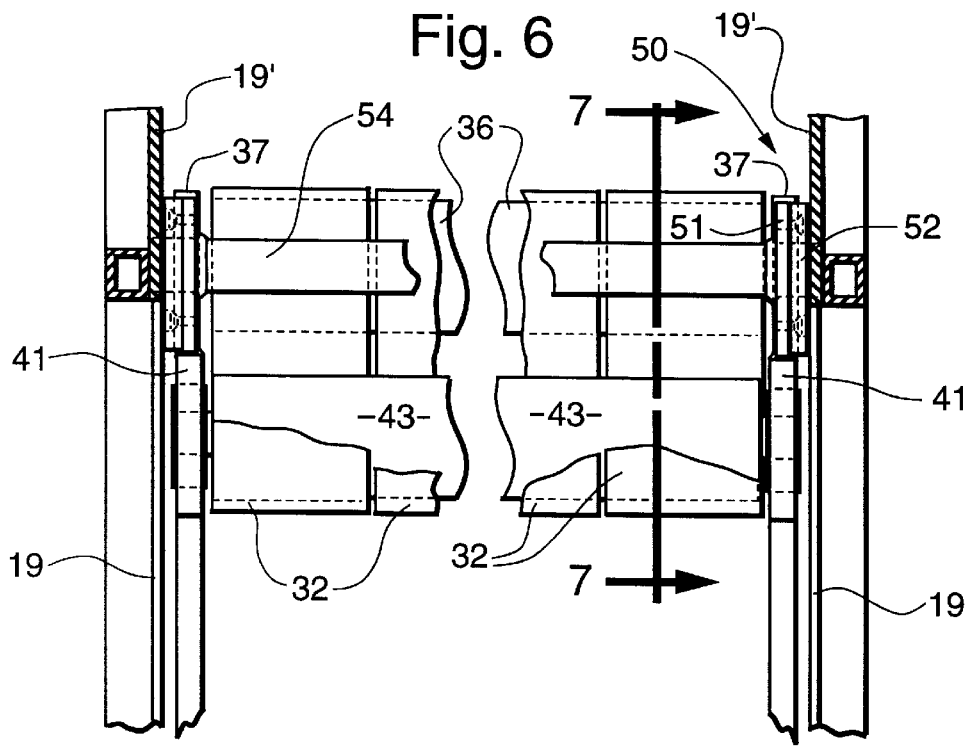
FIG. 6 is a partial sectional view taken in the direction of arrows 6—6 in FIG. 5.
Figure 7:
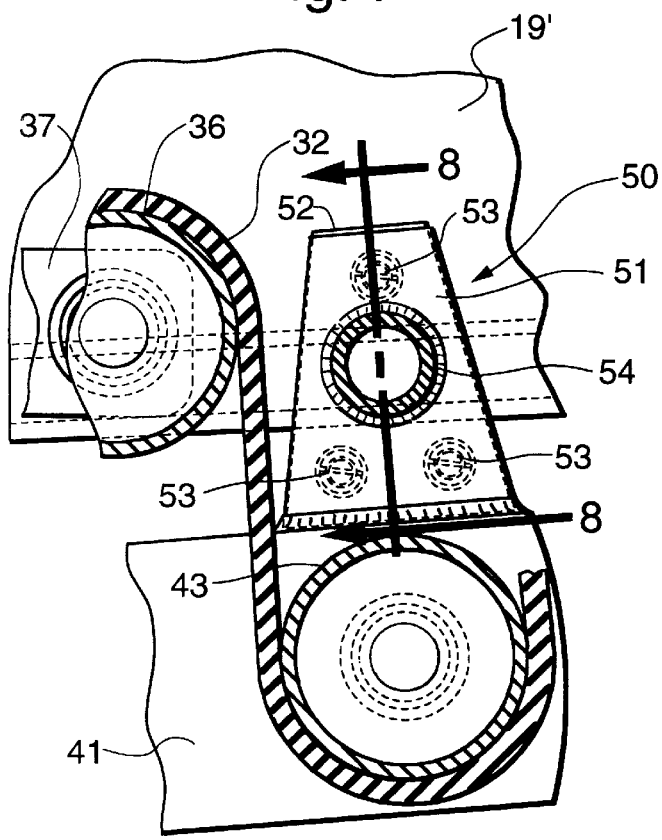
FIG. 7 is a partial sectional view taken in the direction of arrows 7—7 in FIG. 6.
Figure 8:
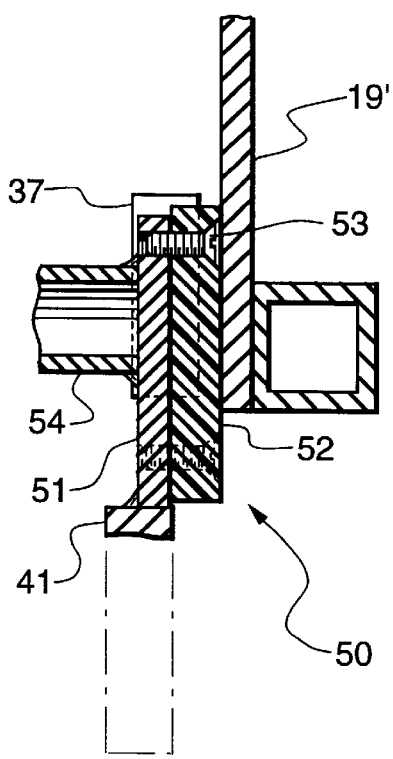
FIG. 8 is a partial sectional view taken in the direction of arrows 8—8 in FIG. 7.

Now turning to FIGS. 6–8, guide assembly more specifically comprises a pair of flange elements 51 affixed to and extending upwardly from the distal ends of takeup arms 41. Here again, as noted above, only the elements on one side of the baler will be described in detail while it is apparent that the same elements on the opposite side of the machine would also be similarly described. A pad 52 is secured to the outer surface of flange element 51 by means of conventional holding means such as screws 53. Pad 52 is fabricated from a plastic material with a smooth surface, such as polyethylene. Completing the assembly is a tubular support element 54 extending transversely between the opposing inner surfaces of flange elements 51.

Included among the many explicit and implicit advantages realized by the unique design set forth above is the ability of the assembly to control the position of the sledge in the preferred embodiment, which thereby maintains alignment during bale formation, helpful in more readily controlling bale shape. Also, the simplicity of the design renders it design friendly, i.e., it is conceivable that the flange elements could be integral with the arms to which they are affixed, the important aspect being that the ends are within the confines of the inner wall surfaces of the tailgate 19'.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a round baler for forming crop material into cylindrical bales, said baler having a main frame, including a pair of opposing forming walls having inner surfaces between which said bales are formed, a tailgate, pivotally connected to said main frame, including a pair of opposing sidewalls having inner surfaces coextensive with said inner surfaces of said forming walls, said tailgate operative between a closed position during which a bale is being formed, and an open position during which a formed bale is being discharged, a sledge assembly mounted on said main frame for movement between a bale starting position and a full bale position, said sledge assembly including conveying means having a crop engaging surface extending transversely of said main frame, an apron supported along a continuous path on said main frame and on said tailgate by a plurality of rotatable guide members, said apron path having an inner course that cooperates with said conveying means on said sledge assembly to define a bale forming chamber, drive means for moving said apron along said continuous path, said drive means including means operatively engagable with said apron, and a pickup for feeding crop material into said chamber, the improvement comprising a pair of take up arms affixed to said sledge assembly for movement therewith between said bale starting position and said full bale position, and guide means mounted on the distal ends of said take up arms, said guide means maintaining the position of said take up arms between the sidewalls of said tailgate during operation.

2. In a round baler as set forth in claim 1 wherein
   said guide means comprise a pair of upwardly extending flange elements.

3. In a round baler as set forth in claim 2 wherein
   said guide means further comprise a pair of plastic pad secured, respectively, to the outer surfaces of said upwardly extending flange elements, the outer surface of said plastic pads slideably engaging said inner surfaces of said opposing sidewalls.

4. In a round baler as set forth in claim 2 wherein
   said guide assembly further comprises a transverse support element extending between said pair of upwardly extending flange elements.

* * * * *